Figure 1:
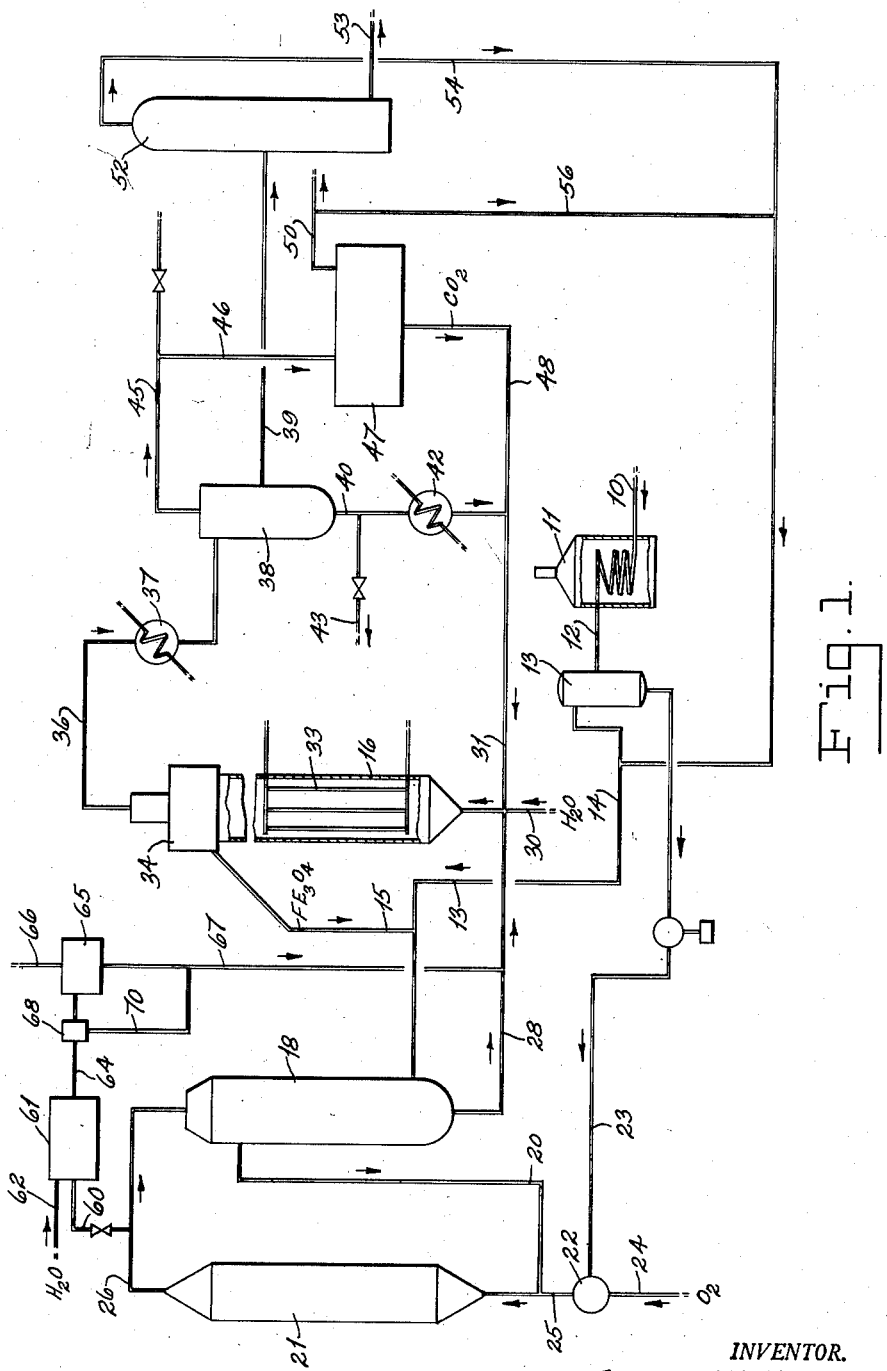

Jan. 22, 1952 C. W. WATSON 2,583,164
PRODUCTION OF LIQUID HYDROCARBONS, OXYGENATED
HYDROCARBONS AND THE LIKE
Filed Sept. 8, 1949 2 SHEETS—SHEET 1

INVENTOR.
CLAUDE W. WATSON
BY
ATTORNEYS

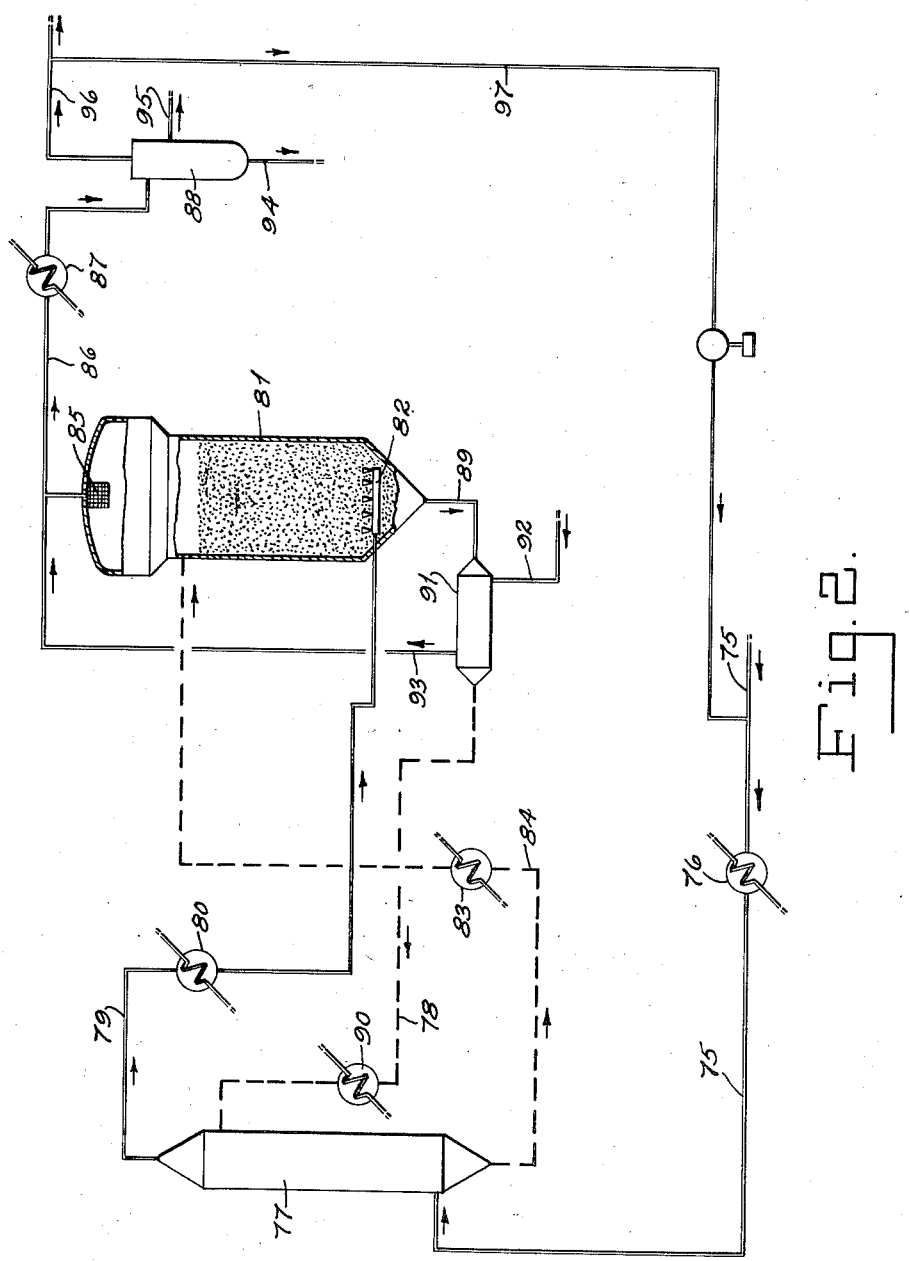

Patented Jan. 22, 1952

2,583,164

UNITED STATES PATENT OFFICE 2,583,164

PRODUCTION OF LIQUID HYDROCARBONS, OXYGENATED HYDROCARBONS AND THE LIKE

Claude W. Watson, Port Arthur, Tex., assignor to The Texas Company, New York, N. Y., a corporation of Delaware Application September 8, 1949, Serial No. 114,620

21 Claims. (Cl. 260—449.6)

The present invention relates to the conversion of carbonaceous materials containing hydrogen, such as crude oil, natural gas, undesired residual hydrocarbon fractions and the like, as well as coals and other solid carbon-containing materials which include substantial proportions of hydrogen into synthetic fractions of hydrocarbons, oxygenated hydrocarbons and mixtures thereof.

Broadly, the invention contemplates first converting the carbonaceous feed material into a synthesis gas by reaction at elevated temperatures with a readily reducible oxide of a hydrocarbon synthesis catalyst containing a catalytic metal such as iron, cobalt, nickel or ruthenium capable of forming readily reducible oxides. The resulting synthesis gas and the reduced metal oxide particles are subsequently contacted at a somewhat lower temperature in the hydrocarbon synthesis range at which the particles become catalytically effective to convert the hydrogen and carbon oxide into desired product fractions. The catalyst particles are reconverted to a highly oxidic form providing a continuous oxygen source for gasification of carbonaceous feed material, and largely or completely obviating the requirement for rectified molecular oxygen otherwise encountered in the production of pure synthesis gas. Moreover, the hydrocarbon synthesis step operates with materially reduced production of undesired by-product gases such as methane, carbon dioxide and water vapor, thereby enabling increased yield of desired liquid product fractions.

The present invention is a continuation-in-part of my copending application Serial No. 758,360, filed July 1, 1947 (D#29,968), now abandoned, to which reference is hereby made for the details of the process therein disclosed. That application in general discloses utilization of an oxidized hydrocarbon synthesis catalyst comprising a metal of the iron group, or ruthenium, as an oxygen-carrier in the generation of synthesis gas at an elevated temperature as above. The synthesis gas product, advantageously containing the reduced metal oxide, is cooled, during which step the synthesis gas forming reaction at least partially tends to reverse with the liberation of exothermic heat energy which is advantageous in thermally supporting the endothermic gas generation step. Thereafter, with the introduction of a supplemental addition of carbon dioxide and/or water vapor, the synthesis of hydrocarbons is completed at conventional hydrocarbon synthesis temperatures.

Advantageously, the final hydrocarbon synthesis step is carried out in the presence of a substantial recycle of carbon dioxide such that there is substantially no net production of carbon. Manifestly, this carbon dioxide, together with by-product water vapor formed during the synthesis of hydrocarbons, as well as that supplementally added, constitutes a highly oxidizing atmosphere in the synthesis zone. Therefore, the catalyst particles are subjected to substantial reoxidation. Moreover, the undesired by-product water vapor is consumed with the liberation of additional free hydrogen in the reaction zone. Accordingly, as intimated above, the production of the undesired gases is suppressed and the yield of desired fractions is improved.

In accordance with the present invention, it has been found that these significant advantages are also inherent in broadly effecting the generation of synthesis gas by high temperature oxidation of the carbonaceous feed with the readily reducible oxide of a hydrocarbon synthesis catalyst, and thereafter employing the reduced catalyst particles at synthesis temperature to effect the reconversion of the synthesis gas into the desired product fractions. In other words, important benefits of improved liquid yield and economical generation of synthesis gas are present, irrespective of whether the generated gas is cooled to synthesis temperature in the presence of the reduced catalyst particles, or separately reduced in temperature and thereafter converted into hydrocarbons in the presence of the reduced particles.

Broadly, therefore, in accordance with the present invention, catalyst particles are withdrawn from the hydrocarbon synthesis reaction zone containing the oxide of the catalyst metal, subjected to supplemental oxidation if necessary, or possible, and subjected to an elevated temperature in the range of 1000-2000° F. or higher in the presence of the hydrocarbonaceous feed. Contact is maintained until substantial conversion of the reactants takes place into synthesis gas, composed essentially of hydrogen and carbon monoxide, and the relatively reduced metal oxide. The reduced solid particles and the product synthesis gas are withdrawn either in admixture or separately, cooled to the hydrocarbon synthesis range and subjected to contact in the synthesis reaction zone for the formation of the final hydrocarbon products.

Therefore, it is contemplated broadly contacting the metal oxide and the feed gases either concurrently or countercurrently in the synthesis gas generation zone, as well as operating the synthesis reaction zone under varying oxidizing influences. For example, in lieu of effecting substantially complete oxidation of the catalyst in the reaction zone, relatively mild conditions of oxidation may prevail therein, provision being made for subjecting the partially oxidized catalyst to complete or a more complete oxidation, as by steaming or the like upon withdrawal from this zone and prior to introduction into contact with the incoming hydrocarbon feed.

Advantageously, however, as above intimated, the synthesis reaction is carried out in an atmosphere of substantial oxidizing activity, particularly in the presence of carbon dioxide and water vapor, such that substantial reoxidation of the catalyst particles occurs.

In accordance with one preferred embodiment of the invention, the proportion of carbon dioxide is maintained at such a level that net production thereof is substantially inhibited, except where there is a deficiency in available hydrogen in the feed when compared to the hydrogen-to-carbon ratio required in the product. As a result, the catalyst particles are largely or substantially entirely converted to the oxide. For example, with a normally gaseous or liquid hydrocarbon feed using a typical iron hydrocarbon synthesis catalyst, and a sufficient carbon dioxide partial pressure in the reactor to suppress net formation thereof, the iron is converted in the reactor to essentially $Fe_3O_4$. Under hydrocarbon synthesis conditions which are less actively oxidizing, the catalyst may be only partially reoxidized during synthesis as a result of which the particles, as above intimated, are advantageously subjected to supplemental oxidation, after withdrawal from the synthesis zone.

In the gas generation zone, temperatures are maintained preferably above 1500° F. Therein, a vaporized fraction of crude oil, for example, reduces the iron oxide, yielding hydrogen and carbon monoxide.

In accordance with one preferred embodiment referred to above, the reaction products, namely, the product stream of synthesis gas containing reduced catalyst particles, preferably entrained therein, are subjected to temperature reduction to effect at least partial reversal of the reaction. Such cooling is apparently accompanied by some hydrocarbon production, carbiding of the catalyst particles and formation of carbon dioxide.

It is important to note that the reactions occurring on cooling are substantially exothermic and appear to proceed progressively throughout the range between the gas generation temperature and a final cooling temperature in the range about 350-800° F.

It is particularly important to note that the exothermic reactions occurring during cooling afford, from the standpoint of economical operation, an important source of thermal energy for supporting the high temperature endothermic reaction between the carbonaceous feed material and the metal oxide supplied to the regeneration zone.

Therefore, provision is advantageously made for counter-currently heat-exchanging the incoming, relatively cool mixture of feed stock and oxide in countercurrent relationship to the high temperature gas generator product, operating to cool the generator gases and at the same time raise the feed mixture to the elevated reaction temperature of the gas generation step.

Any additional thermal requirements for reaction of the carbonaceous feed and the oxidic catalyst may be made up by supplying thermal energy from any outside source; as for example, by combustion of a fuel, which may be a limited portion of the carbonaceous feed material, with the stream of free oxygen. This may be carried out internally within the reaction zone or in indirect heat exchange relation with the reaction mixture. For example, heat may be supplied to the gas generation zone by the introduction of suitably preheated, solid, heat-carrying bodies in the form of sand or pellets. In any event, the requirement for molecular oxygen over and above the thermal energy supplied by reaction reversal during cooling approaches the minimum necessary to thermodynamically support the process.

In the final synthesis zone, the catalyst, as indicated above, is subjected to oxidation and the hydrogen and carbon monoxide reacted catalytically to form the desired hydrocarbon fractions and water vapor. With the usual hydrocarbon feeds in the presence of adequate carbon dioxide in the synthesis zone, in accordance with the preferred embodiment, there is substantially no net carbon dioxide production and presumably, equilibrium is approached in accordance with the water gas shift reaction:

$$CO_2 + H_2 \rightleftharpoons H_2O + CO$$

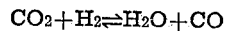

so that there is a maximum availability of hydrogen and carbon monoxide for the production of desired hydrocarbons. Therefore, under the conditions prevailing under synthesis, water vapor present and being formed supplies a portion of the requirement for the oxidation of the catalyst particles and liberates, by its decomposition, a substantial quantity of free hydrogen. Therefore, the conditions manifestly favor the presence of maximum hydrogen and carbon monoxide and minimum water vapor, all of which factors tend to direct the water-gas shift reaction to the right, as above represented, meanwhile favoring formation of iron oxide and the maximum conversion of hydrogen and carbon monoxide into desired hydrocarbons.

It is important to note that when operating with the maximum production of desired liquid product fractions, the suppression of by-product water vapor and carbon dioxide production tends to result in a corresponding suppression of light hydrocarbon gas formation. Therefore, the process is of particular advantage in the production of hydrocarbon fractions containing more than two carbon atoms, particularly the selective formation of hydrocarbons essentially in the liquid boiling range.

As above indicated, it is advantageous to avoid a large excess of hydrocarbon feed stock over the stoichiometrical combining proportion corresponding to the reducible oxide supplied to the generation zone. Therefore, the metal oxide, as for example, $Fe_3O_4$, is preferably supplied in an excess amounting from about 1.0 to about 1.50, and at best, not more than 1.25 times the theoretical combining proportion in which the oxide is reduced to metallic iron with the oxidation of all of the hydrocarbon to hydrogen and carbon monoxide.

Supplemental addition of water vapor to the feed of the final synthesis step in accordance with the proposed embodiment of the invention is advantageously carried out in the range of 0.2 to 1.4 mol of water vapor per gram-atom of carbon present in the feed, optimum addition usually occurring in the lower portion of this range, substantially below the maximum. Actually, the pressure addition of H₂O required for maximum yield of desired product fraction varies with reaction conditions being dependent upon such variable factors as the degree to which the catalyst is carbided before water vapor addition, the prior extent of water formation as the result of intermediate reaction of hydrogen, carbon monoxide and the like, the specific catalyst employed, and many others. Therefore, in practice it will always be determined by adjusting the rate of introduction of water vapor until hydrocarbon yields are in the optimum range.

As is further intimated above, the optimum introduction of carbon dioxide to the synthesis zone is also dependent on complex variables so that, it, likewise is in practice determined by trial and error adjustment until there is substantially no net production of carbon dioxide, or preferably not more than 5% on the basis of the carbon supplied to the system with liquid or gaseous hydrocarbon food stocks.

The temperature of the synthesis reaction zone is that conventionally characteristic of the catalyst employed. For example, in the broad range of about 350–700° F., and in the case of iron catalysts, within the range of 500–700° F. and preferably from about 550 to 650° F., where normally liquid hydrocarbons are desired.

Reaction pressures may vary from atmospheric upwardly, and in the case of iron catalysts, pressures from 100 to 600 p. s. i. g. and above are preferred. However, pressure may vary with the catalyst employed, in the case of a cobalt catalyst, advantageously being maintained about atmospheric and not more than about 100 p. s. i. g. Iron catalysts are, however, most advantageous for the present purposes and are herein referred to for purposes of specific illustration.

Advantageously, the catalyst is handled in finely divided form, affording a high degree of contact surface. Therefore, it is preferred to circulate the catalyst in the form of a fine powder, preferably approaching smoke, from the standpoint of particle size. In this form it is readily entrained in the stream of reactants in which case special provision is made for mechanical separation of the solid particles from the final products of reaction. Actually, it has been found that in the case of an iron catalyst this is readily effected by magnetic separating means since in its oxidic form, the catalyst is largely $Fe_3O_4$.

In order to facilitate more specific understanding of the invention, reference is had to the accompanying drawings, wherein Figures 1 and 2 disclose more or less diagrammatically, set forth preferred embodiments thereof.

In Figure 1, the numeral 10 designates a feed inlet conduit supplying liquid hydrocarbon stream from any suitable source not shown. The stream which, for purposes of illustration, may be a crude oil containing carbon and hydrogen in the approximate atomic ratio of 1:2, is fed directly into a crude oil vaporizer 11, where the temperature is raised to, for example, 600° F. and the vaporized product discharged via pipe 12 into flash drum 13. The overhead vaporized fraction from flash drum 13 passes through pipe 14 where it is injected with finely divided $Fe_3O_4$ from communicating standpipe 15 supplied from synthesis reactor 16, as will hereinafter be described in further detail.

The fluidized stream, with the entrained catalyst, passes directly into the lower portion of countercurrent heat exchanger 18, where it is raised in temperature to 1800° F. At this temperature, the stream passes by way of pipe 20 into the lower portion of a generator 21, where a brief residence time permits the reaction to come to equilibrium.

Additional thermal requirements of the generator 21 are supplied by combustion of the stream of unvaporized feed stock pumped from the bottom of flash drum 13 to burner 22 by way of branch pipe 23, and burned with a stream of pure oxygen or air introduced from any suitable source, not shown, through inlet pipe 24. As indicated, the products of combustion, advantageously predominantly hydrogen and carbon monoxide, pass directly through pipe 25 into the generator inlet pipe 20.

The generator effluent withdrawn from outlet pipe 26 comprises essentially hydrogen, carbon monoxide and reduced catalyst at an elevated temperature of, for example, 1900° F. This is conducted, as indicated, through the heat exchanger 18 in countercurrent, indirect relationship to the aforementioned stream of reactants, during which time its temperature is reduced progressively to the range of about 650° F., while the exothermic reaction going on in the stream, furnishes thermal energy for the oxidation of the feed stock stream.

At the reduced temperature, the effluent stream of reduced catalyst is conducted by pipe 28 to the lower portion of the aforementioned synthesis reactor 16.

It is pertinent to point out that the heat exchanger 18 may comprise any suitable, indirect, countercurrent instrumentality capable of transferring heat from the generator product to the incoming feed stream. In its broadest sense, it includes regenerators or any other desired form of heat transfer instrumentality.

Where the entrained catalyst in the respective streams forms a good, dense fluid phase, heat transfer is surprisingly promoted. On the other hand, where the catalyst closely approaches or exists in the condition of an impalpable smoke, it has been found that thermal efficiency of the exchanger may be promoted by including inert, solid particles which may be fluidized or not and which may remain in the heat exchanger passages at the linear fluid flow velocities employed.

The residual stream of gas entering the reactor 16 through pipe 28 is injected with a stream of water vapor which may assist in performing the function of converting the reduced iron particles into iron oxide, with the incidental formation of sufficient additional hydrogen to provide the proper combining proportion necessary for reduction of the carbon oxides to hydrocarbons. Of primary importance, however, is the fact that with the conversion of the catalyst to the oxide, the consumption of the carbon dioxide and hydrogen in the final step of hydrocarbon synthesis is initiated, and goes rapidly to completion.

The water vapor may be injected from any suitable source by way of inlet pipe 30, or may be derived from the reaction product condensate through pipe 31, as will hereinafter be more fully apparent. Optimum addition, as indicated above, is that at which the catalyst is converted substantially to $Fe_3O_4$ in the reactor 16.

The temperature at which the water vapor is added may be controlled to adjust the total reactor feed to the desired total feed inlet temperature.

Proper temperature within the synthesis reactor 16 is maintained by means of heat exchanger 33 or by any other suitable temperature control means. The reaction products, passing upwardly, move into magnetic separation section 34 wherein the solid particles are separated and delivered downwardly into the standpipe 15 abovementioned. The effluent product gases, free of solids, are withdrawn through outlet pipe 36, passed through condenser 37 and directed into separator 38, where the normally liquid products are separated into an oily layer, delivered through pipe 39, and an aqueous layer, delivered through pipe 40.

Pipe 40 may supply the water required for converting catalyst to $Fe_3O_4$ as above mentioned, and to this end, boiler 42 is provided in line 40, the effluent vapors passing directly into recycle line 41 as shown. Excess water may be withdrawn through valve pipe 43 as required. Effluent normally gaseous products, usually largely carbon dioxide, and any small amount of unreacted hydrogen and carbon monoxide, pass overhead from the separator 38 by way of conduit 45, and may be vented as required. The larger portion, however, is usually passed by way of branch pipe 46 to a gas plant 47, which in the present instance functions to separate and deliver a relatively pure stream of carbon dioxide through pipe 48. Residual gases are recovered by way of pipe 50. The details of the gas plant, per se, form no part of the present invention and may take any convenient form, for example, the conventional Girbotol absorption process, using triethanolamine or the like as an absorbent for the carbon dioxide.

As indicated, pipe 48 joins with pipe 30, whereby the carbon dioxide stream is supplied in controlled relative quantities as recycle to the synthesis reactor 15.

The product stream of conduit 39 passes to any suitable recovery system, such, for example, as the fractionization and stabilization system represented diagrammatically by the reference number 52, from which final liquid boiling product is recovered at 53. The overhead withdrawn through pipe 54 is returned as indicated to pipe 14, whereby desired light, gaseous hydrocarbons are recycled to the system to provide an additional source of hydrocarbonaceous feed material. Similarly, any desired portion of the normally gaseous products otherwise discarded through line 50 may be directed into recycle line 54 through branch pipe 56.

It is pertinent to point out that in some cases, as for example, where the production of undesired gases is reduced to a minimum in the synthesis reactor, the gas separation plant 47 may be omitted and any desired portion of the normally gaseous stream from the separator 38 recycled directly to the reactor. Though not shown in Figure 1, it is important that provision be made in some cases, e. g., when processing coal, for recycling some of the total gas from separator from line 45 by its introduction into line 48.

The hydrocarbon product of the present process usually approximates roughly an atomic ratio of combined carbon and hydrogen in the range of about 1:2 or somewhat lower. It follows, therefore, that with a liquid hydrocarbon feed stock, containing approximately the same ratio of carbon and hydrogen, the present process has the important advantage of operating in approximate balance with relation to the total utilization of raw material.

With feed stocks relatively high in hydrogen, such for example, as natural gas, release of excess hydrogen from the system is required. Conversely, where feed stock is deficient in hydrogen, as in the case of many coals of relatively low "available" hydrogen content, there is a corresponding excess of carbon which is conveniently separable in the form of carbon dioxide. Recovery of the excess hydrogen in the system may be conveniently effected in the foregoing embodiment by means of valved branch pipe 60, which receives any desired portion of the generator effluent from line 26 for passage through water-gas shift converter 61 in admixture with a suitable proportion of water vapor introduced from any outside source by way of inlet pipe 62. In the shift converter, the mixture of hydrogen, carbon monoxide and water vapor is converted in known ways, preferably through contact with a dense phase fluid bed of iron oxide catalyst, into essentially hydrogen and carbon dioxide. This product passes, by way of line 64, to a gas plant 65, effective to deliver hydrogen through outlet pipe 66. The residual carbon dioxide flows into synthesis reactor inlet pipe 28 through branch pipe 67. A suitable separator, such as magnetic separator 68, disposed in line 64, separates and delivers solid catalyst into line 67 through standpipe 70.

In continuous operation, therefore, the feed stock is mixed with the fine iron oxide and raised in exchanger 18 to a temperature at which it is oxidized with the formation of hydrogen and carbon monoxide. Additional thermal energy is supplied as required and after the product comes to equilibrium, the effluent mixture, including the reduced catalyst, is returned to exchanger 18 to heat the incoming reactants, causing a reaction reversal and being discharged at a lower temperature.

Addition of water vapor at the lower elevated temperature effects formation of additional hydrogen and initiates the completion of the catalytic synthesis reaction between gaseous carbon oxide and hydrogen in the reactor 16. Meanwhile, recycle of carbon dioxide is so controlled as to restrict the net production of carbon dioxide to a low or negligible level consistent with maximum utilization of raw materials, and assure delivery of separated effluent catalyst substantially in the form of $Fe_3O_4$.

In accordance with one example of the present invention, finely divided, recycled catalyst is mixed with a stream of vaporized hydrocarbon oil at a temperature of about 600° F. and in the proportion of about 34.8 lbs. of recycled catalyst per liquid gallon of oil. The recycled catalyst in this example is composed of finely divided, used catalyst from a synthesis operation in such a condition of subdivision that it remains fully entrained without slippage or apparent settling in the moving stream of oil vapor. The suspension of recycled catalyst in vapor is heated from about 600° F. up to about 1900° F. and then passed through a chamber maintained at about 1900° F. by external or internal heating, with the required residence time usually less than ten seconds. The effluent product, including entrained solid particles, is passed through an indirect cooler which brings it to a temperature of about 650° F. At this temperature, the resulting water vapor is injected at a rate less than 1.0 mols per atom of carbon in the feed stock, and the mixture together with normally gaseous product recycle, as indicated below, is fed into the lower portion of a synthesis reactor operating at about 625° F.

Residence time of the gaseous reactants in the synthesis reactor is about ten seconds or less. The solid catalyst is removed from the stream of reaction products leaving the reactor by a magnetic separator and returned continuously to the incoming stream of vaporized oil as above mentioned.

The gasiform products of reaction are condensed at 70° F. and separated into a water layer, an oil layer and an overhead of normally gaseous products.

The overhead normally gaseous products from the separator are recycled to the inlet of the synthesis reactor at a recycle rate of about 5:1 on the basis of the entering feed gases from the generator. Under these conditions, the product oil layer comprises a major portion of hydrocarbons boiling in the motor gasoline range and corresponding to about 60 per cent of the feed stock supplied. The net production of carbon dioxide amounts to less than about 5 per cent on the basis of the carbon fed to the system, when the atomic ratio of carbon to hydrogen in the fresh feed is approximately 1:2.

The alternative embodiment disclosed in Figure 2 of the drawing contemplates, primarily, a system wherein the gas formation zone, and also the synthesis zone where desired, are supplied with a catalyst of high settling rate relative to the upflow of gases such that the solids gravitate downwardly in countercurrent relationship to the upflowing gaseous reactants and are thereafter transferred separately between the reaction zones. To this end, the carbonaceous feed stock, as for example, a hydrocarbon fraction, from any suitable source not shown, flows through pipe 75 and exchanger 76 into the lower part of an upstanding gas generator 77.

In the preheater, the hydrocarbon vapors are raised to 1000° F. or above, and preferably, a temperature above 1500° F. at which the feed is completely vaporized.

Flowing upwardly through gas generation chamber 77, the vapors are continuously contacted by downwardly gravitating particles of oxidic catalyst introduced through dotted line 78, which represents more or less symbolically any suitable conveyor system, either pneumatic or mechanical. The particles in generator 77 may take the form of a downwardly moving, dense fluid phase, or simply a mass of showering particles, in which provision, not shown, is advantageously made for distributing the particles uniformly over the cross-section of the vessel. The effluent gases withdrawn from the upper extremity of the vessel 77 through pipe 79, and comprising essentially hydrogen and carbon monoxide with only minor, entrained portions of catalyst particles, pass through exchanger 80, where they are cooled to synthesis temperature and are thereafter introduced into the bottom of synthesis reactor 81 through distributing means 82.

The reduced catalyst particles are withdrawn from the bottom of the generator 77 by suitable transport line 84, cooled in exchanger 83, and passed into the upper portion of the synthesis reactor 81. Here they likewise gravitate downwardly in contact with the upflowing reactants, preferably in the form of a dense fluid phase mass which converts the upflowing reactant stream into the desired hydrocarbon and/or oxygenated hydrocarbon fractions.

The effluent stream flows through filter 85 into pipe 86, which conveys it through exchanger 87 into a decanter 88, in which separation takes place between the normally gaseous, oily and aqueous fractions.

The particles of catalyst, preferably in a condition of substantial reoxidation, accumulate in the base of reactor 81 and are withdrawn through standpipe 89 and directed into aforementioned conveying line 78, preferably through a heat exchanger 90.

Advantageously, however, supplemental or complete oxidation of the withdrawn catalyst is first effected by passing the particles into an oxidation zone 91, wherein they are subjected to contact with an oxidizing agent such as high temperature steam, oxygen or the like, introduced through a pipe 92. The gaseous products of reaction, if any, are removed through outlet pipe 93, where, as is preferred, the oxidizing agent comprises high temperature steam; the effluent gas consists largely or substantially entirely of free hydrogen which accordingly is passed as indicated into line 86. As a result, any excess water vapor is discharged in pipe 94, while the hydrogen may be returned to the system to form additional desired product. For example, normally gaseous fraction passes overhead as at 96, any desired portion returning by means of recycle line 97 into the inlet pipe 75. Alternatively, all or any portion of the recycle stream in pipe 97 may be directed into pipe 79 supplying the synthesis zone. In either case, substantial proportions of carbon dioxide are thus returned to the synthesis zone.

As previously indicated, separation may be made between the product gas and carbon dioxide in line 96 with selective return of hydrogen and $CO_2$ to the synthesis zone.

The oily product layer is removed from separator 88 through line 95.

In general, therefore, the embodiment of Figure 2 functions continuously to effect countercurrent contact of oxidic catalyst with the upflowing feed vapors in the generator to yield a product gas comprising essentially hydrogen and carbon monoxide, and a separate stream of relatively reduced catalyst particles, both of which are cooled to the synthesis temperature range and continuously subjected to interaction for the production of desired product fractions.

In the interest of diagrammatic simplicity, it is to be understood that conventional reaction zone heating furnaces, exchanger, pumps and other transportation instrumentalities, valves, controls, etc. have been omitted. However, it is to be understood that the heat exchangers may be interrelated in accordance with good engineering practice as indicated in Figure 1, for maximum thermal energy conservation. For example, the exchanger 76, 90, or both, may derive thermal energy from the cooling exchangers 80 or 83.

As above indicated, the term carbonaceous feed stock containing hydrogen contemplates liquid, gaseous or even solid hydrocarbon fractions and includes, for example, coals which as is known include substantial proportions of hydrogen. In the case of solid hydrocarbonaceous materials, the gasification reaction with the metal oxide may be effected by either supplying the coal in the form of a fine, preferably impalpable powder, as a fluid product of coal liquefaction effected in any conventional manner. Where fine powdered feed is employed, a portion of the gases from line 45 of Figure 1 may be returned advantageously through lines 54 and/or 56 of Figure 1, for example, to fluidize and gasify the coal during such operation. When feeding low available hydrogen content feeds, such as coal, or heavy fuels, it is advantageous to add to such feed stocks natural gas or other feed as may be required to bring the atomic carbon-to-hydrogen ratio of the combined feed to substantially that of the desired product, namely, 1:2.

From the foregoing, it is apparent that the present invention substantially obviates the requirement for pure molecular oxygen in the synthesis of hydrocarbons, and results in improved product yields without the substantial undesired transformation of feed carbon into undesired by-product carbon dioxide as heretofore encountered.

Obviously, many modifications and variations of the invention as above set forth may be made without departing from the spirit and scope thereof, and only such limitations should be imposed as are indicated in the appended claims.

I claim:

1. In the synthesis of desired fractions of hydrocarbons, oxygenated hydrocarbons and mixtures thereof, wherein synthesis gas comprising hydrogen and carbon monoxide is prepared by the partial oxidation of a hydrogen-containing carbonaceous feed material and thereafter subjected to catalytic conversion into said desired product fractions, the improvement which comprises generating said synthesis gas by contacting said carbonaceous feed material with a readily reducible oxide of a metal which is catalytically active for the synthesis of hydrocarbons from hydrogen and carbon monoxide, at an elevated temperature such that said metal oxide catalyst is reduced and the carbonaceous feed material is thereby partially oxidized to form synthesis gas composed essentially of hydrogen and carbon monoxide, thereafter contacting said synthesis gas with said reduced synthesis catalyst in a synthesis zone at a temperature in the range at which the catalyst is active to produce said desired product fractions thereby oxidizing the reduced catalyst, and employing the oxidized catalyst from the synthesis zone to effect said oxidation of said carbonaceous feed material.

2. The method according to claim 1, wherein contact between said metal oxide catalyst and carbonaceous feed material is effected with the reactants moving in substantially the same direction of flow.

3. The method according to claim 1, wherein the conversion of said synthesis gas into said desired product fractions is effected in the presence of an oxidizing agent of the class consisting of $H_2O$ and $CO_2$ effective to cause substantial reoxidation of said catalyst.

4. In the synthesis of desired fractions of hydrocarbons, oxygenated hydrocarbons and mixtures thereof, wherein synthesis gas comprising hydrogen and carbon monoxide is generated by the partial oxidation of hydrogen-containing carbonaceous feed material, and thereafter converted into said desired product fractions by contact with a hydrocarbon synthesis catalyst at an elevated synthesis temperature in a synthesis zone, the improvement which comprises continuously effecting conversion of said synthesis gas into desired product fractions with hydrocarbon synthesis catalyst comprising iron, thereby effecting substantial oxidation of said catalyst, continuously reacting said oxidized catalyst with said carbonaceous feed material containing hydrogen, in a gas generation zone, at an elevated temperature at which the oxidized catalyst is reduced and the carbonaceous material partially oxidized, with the generation of substantial quantities of synthesis gas, and continuously returning said reduced oxidic catalyst to contact with said synthesis gas in the synthesis zone for the production of said desired product fractions.

5. The method of converting carbonaceous feed materials containing hydrogen into desired hydrocarbon fractions which comprises reacting said carbonaceous feed material with a readily reducible oxide of a metal which is catalytically active for the synthesis of hydrocarbons from carbon monoxide and hydrogen under conditions including an elevated temperature at which the carbonaceous feed material is oxidized to hydrogen and carbon monoxide, reducing the temperature of the resulting mixture of product gases comprising $H_2$, CO and reduced oxide by indirect heat exchange with said carbonaceous feed material being supplied for oxidation by said readily reducible oxide to form hydrogen and carbon monoxide as aforesaid, thereby effecting liberation of exothermic heat energy and formation of desired synthetic hydrocarbons in the said mixture during said temperature reduction.

6. The method according to claim 5 including the additional steps of adding water vapor to said mixture after said temperature reduction to reoxidize said catalyst, subjecting said reoxidized catalyst to contact with the resultant gaseous products at synthesis reaction temperature to form additional desired hydrocarbon products of reaction and employing said reoxidized catalyst to effect said oxidation of said carbonaceous feed material.

7. The method of claim 6, wherein the catalyst comprises iron.

8. The method of claim 6, wherein oxidation of the carbonaceous feed material by said readily reducible oxide occurs at a temperature in the range of from about 1000 to 2000° F.

9. The method defined in claim 6, wherein carbon dioxide contained in the products of the final synthesis reaction is recycled to the final synthesis zone at a sufficient rate to substantially suppress net formation of carbon dioxide.

10. The method of converting carbonaceous materials containing hydrogen into desired liquid hydrocarbon fractions which comprises subjecting a mixture of said carbonaceous feed material together with at least the combining proportion of finely divided $Fe_3O_4$ to conditions, including an elevated temperature in the range of from 1000 to 2000° F., at which oxidation of the carbonaceous feed material essentially to hydrogen and carbon monoxide is completed and the $Fe_3O_4$ is reduced, thereafter reducing the temperature of the effluent product, including the reduced $Fe_3O_4$, by countercurrent indirect heat exchange with additional carbonaceous feed material and oxidized catalyst being supplied for said reaction to form hydrogen and carbon monoxide, effecting liberation of exothermic heat energy during such temperature reduction, adding water vapor to the reaction mixture at a temperature effective to oxidize said reduced catalyst during the subsequent synthesis reaction, maintaining contact between said catalyst and resultant gaseous stream at synthesis reaction temperature until a substantial degree of conversion to desired liquid hydrocarbon products has occurred, and introducing carbon dioxide to the synthesis zone at a rate sufficient to limit net carbon dioxide production to less than five per cent on the basis of the carbon in the feed stock consumed.

11. The method of converting carbonaceous materials containing hydrogen into desired liquid hydrocarbon fractions which comprises continuously subjecting a stream comprising a mixture of said carbonaceous feed material together with at least the combining proportion of finely divided $Fe_3O_4$ to oxidation under conditions, including an elevated temperature in the range of from 1000 to 2000° F., at which oxidation of the carbonaceous feed material essentially to hydrogen and carbon monoxide is completed, and the $Fe_3O_4$ is reduced, thereafter reducing the temperature of the effluent product, including the reduced $Fe_3O_4$, by countercurrent, indirect heat exchange with said stream of carbonaceous feed material and oxidized catalyst, effecting reaction of said effluent product with hydrocarbon formation and liberation of exothermic heat energy during said temperature reduction, thereafter adding water vapor to the reaction mixture at a temperature effective to oxidize said reduced catalyst, maintaining contact between said catalyst and resultant gaseous stream as synthesis reaction temperature until a substantial degree of conversion to additional desired liquid hydrocarbon products has occurred, introducing carbon dioxie to the synthesis zone at a rate sufficient to limit net carbon dioxide production to less than five per cent on the basis of the carbon in the feed stock consumed, recovering catalyst from the final synthesis zone substantially as $Fe_3O_4$ and continuously employing said $Fe_3O_4$ catalyst to effect said oxidation of the carbonaceous feed material.

12. The method of converting carbonaceous materials containing hydrogen into desired liquid hydrocarbon fractions which comprises continuously mixing an oxidized iron catalyst, essentially in the condition of $Fe_3O_4$, with carbonaceous feed material, effecting oxidation of the carbonaceous feed material by said oxidized iron catalyst under conditions including a final elevated temperature in the range of from 1000 to 2000° F. with the production of reduced catalyst, carbon monoxide and hydrogen, reducing the temperature of said mixed reaction products, reacting the said products at a reduced temperature in the range of from 350 to 800° F. until a substantial proportion of desired liquid hydrocarbons are produced, furnishing sufficient carbon dioxide to said last named reaction to surpress net carbon dioxide formation, supplying sufficient water vapor to the said last named reaction to reconvert the catalyst to essentially the form of $Fe_3O_4$, recovering hydrocarbon products of reaction and employing said $Fe_3O_4$ catalyst to effect said oxidation of the carbonaceous feed material.

13. The method of converting carbonaceous feed material containing hydrogen into desired liquid hydrocarbons which comprises continuously heating said stream of carbonaceous feed material in admixture with $Fe_3O_4$ under conditions including a final elevated temperature at which the carbonaceous feed material is oxidized essentially to carbon monoxide and hydrogen, effecting temperature reduction of the products of reaction, including the reduced iron oxide, with realization of exothermic heat energy, effecting indirect countercurrent heat transfer during said temperature reduction with said stream of carbonaceous feed material and $Fe_3O_4$ whereby to effect heating of said stream, completing the conversion of gaseous products of reaction into desired hydrocarbons in the presence of sufficient added water vapor to effect reoxidation of said catalyst essentially to $Fe_3O_4$, employing said $Fe_3O_4$ catalyst to effect said oxidation of the carbonaceous feed material and recovering product hydrocarbons.

14. The method of converting carbonaceous materials containing hydrogen into desired liquid hydrocarbon fractions which comprises subjecting an admixture of said carbonaceous feed material and an oxidized iron catalyst, a major portion at least of which is in the form of $Fe_3O_4$, the $Fe_3O_4$ in the mixture being in the relative quantity from above about 1.0 to about 1.5 the theoretical combining proportion in which the $Fe_3O_4$ is reduced to metallic iron with the oxidation of the carbonaceous feed material to carbon monoxide and hydrogen, to reaction conditions including a final elevated temperature in the range of from about 1000 to 2000° F., at which oxidation of the carbonaceous feed material is completed essentially to hydrogen and carbon monoxide, reducing the temperature of the mixed reaction product comprising said hydrogen and carbon monoxide and reduced catalyst, to the range from about 350 to 800° F., effecting exothermic interaction between said hydrogen and carbon monoxide during said temperature reduction, thereafter injecting water vapor into said mixed reaction products in the proportion of from about 0.2 to about 1.4 mols of water vapor per atom of carbon supplied to the system as carbonaceous feed, thereby effecting catalytic synthesis of desired product hydrocarbons and reoxidizing the catalyst, and employing said reoxidized catalyst to effect said oxidation of said carbonaceous feed material.

15. The method according to claim 14, wherein the $Fe_3O_4$ is admixed with the carbonaceous feed material in the relative quantity of from above about 1.0 to about 1.25 the theoretical combining proportion.

16. The method according to claim 14, wherein sufficient water vapor is introduced into the said reaction product mixture to effect oxidation of the catalyst in the final reaction step completely to $Fe_3O_4$.

17. In the process of catalytically synthesizing desired hydrocarbon fractions, wherein reactants comprising a carbon monoxide and hydrogen are passed in contact with a hydrocarbon synthesis catalyst comprising a metal capable of forming readily reducible oxide in a reaction zone at a synthesis temperature at which a substantial proportion of said reactants are converted into desired hydrocarbons, the improvement which comprises effecting said contact in the presence of oxidizing gases, in contact with which said catalyst forms an oxide, generating said carbon oxide and hydrogen for contact with said synthesis catalyst by reacting said catalyst oxide with carbonaceous feed material containing hydrogen at an elevated temperature in the range of about 1000 to 2000° F., at which the carbonaceous feed is oxidized with the formation of the mixture of reaction products including hydrogen, carbon monoxide and reduced catalyst, thereafter reducing the temperature of the reaction products to the said synthesis temperature, with liberation of exothermic heat energy and partial formation of hydrocarbons, thereafter supplying water vapor to said mixture in sufficient proportion to effect reoxidation of the catalyst, and employing said reoxidized catalyst to effect said oxidation of the carbonaceous feed material.

18. The method of converting carbonaceous materials containing hydrogen into desired hydrocarbon fractions, which comprises reacting said carbonaceous feed material with a readily reducible oxide of a metal catalytically active for the synthesis of hydrocarbons from carbon monoxide and hydrogen under conditions including an elevated temperature effective to oxidize the carbonaceous feed material to hydrogen and carbon monoxide and reduce said oxide, cooling the resulting mixture of hydrogen, carbon monoxide and reduced metal oxide to a substantially lower temperature by indirect heat exchange with said carbonaceous feed material whereby said hydrogen and carbon monoxide are converted in the presence of said reduced metal oxide into desired hydrocarbon fractions, and subjecting said reduced metal oxide to re-oxidation by adding water vapor to the said cooled mixture.

19. The method of converting carbonaceous materials into desired hydrocarbon fractions which comprises subjecting a carbonaceous feed material containing hydrogen to contact with a catalyst comprising an oxide of a metal of a class consisting of the iron group and ruthenium effective for the direct synthesis of hydrocarbons from hydrogen and carbon oxide, effecting said contact at an elevated temperature in the range at which the said catalyst and the said carbonaceous material react with the reduction of the catalyst and oxidation of the carbonaceous material to hydrogen and carbon monoxide, thereafter reducing the temperature of resultant mixed catalyst and product gases, by indirect heat exchange with said carbonaceous feed material, to the range at which hydrogen and carbon monoxide react in the presence of said catalyst with the formation of said desired products thereby effecting liberation of exothermic heat energy and formation of substantial quantities of said desired products during said temperature reduction and withdrawing said products from contact with the said catalyst.

20. The method according to claim 19, wherein the carbonaceous feed material is subjected to contact with an amount of said catalyst in excess of that stoichiometrically required to convert said carbonaceous feed material into hydrogen and carbon monoxide.

21. The method according to claim 19, wherein said resultant mixture of catalyst and product gases is injected with water vapor after said temperature reduction in an amount sufficient only to increase formation of said desired hydrocarbon products and supplement the oxidation of said catalyst.

CLAUDE W. WATSON.

REFERENCES CITED

The following references are of record in the file of this patent:

UNITED STATES PATENTS

| Number | Name | Date |
| --- | --- | --- |
| 1,899,184 | DeSimo | Feb. 28, 1933 |
| 2,253,607 | Boyd et al. | Aug. 26, 1941 |

OTHER REFERENCES

Audibert et al.: J. Ind. Eng. Chem., vol. 21, pages 880–885 (1929).

Article: "Thoria-Alumina Catalyst Best for Isoparaffin Synthesis," Oil and Gas Journal of January 19, 1946, pages 86 and 89.